United States Patent Office 3,303,800
Patented Feb. 14, 1967

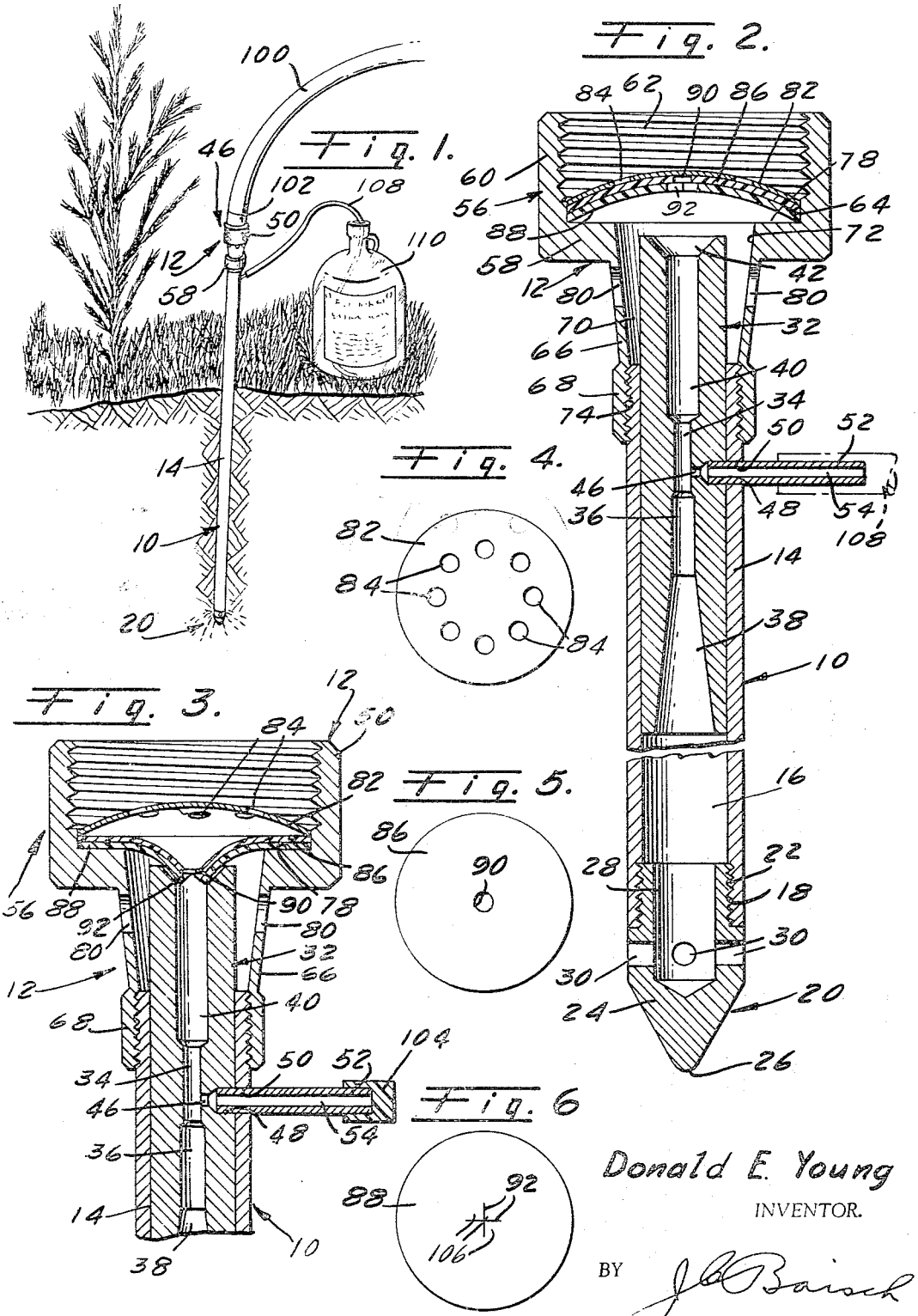

3,303,800
SOIL CONDITIONING APPARATUS
Donald E. Young, La Habra, Calif., assignor of one-half to Milton K. Stabe, La Habra, Calif.
Filed Mar. 12, 1964, Ser. No. 351,369
13 Claims. (Cl. 111—7.1)

This invention relates generally to apparatus for the treatment of soil and relates more particularly to soil conditioning means.

While the invention has particular utility embodied in apparatus or means for conditioning soil, and is shown and described thus embodied, it is to be understood that its utility is not confined thereto.

It is an object of the invention to provide improved soil conditioning means or apparatus.

It is another object of the invention to provide means of this character which will aerate the soil.

Still another object of the invention is to provide means of this character that will irrigate the soil.

A further object of the invention is to provide a device of this character for fertilizing the soil.

A still further object of the invention is to provide means of this character wherewith fungicides may be introduced into the soil.

As is well known adobe and like soil is too hard and compact for satisfactory vegetation growth and it is another object of the invention to provide means for breaking up such hard and compact soil so that it is in proper condition for flourishing plant growth.

Still another object of the invention is to provide means of this character having an anti-siphon device.

A further object of the invention is to provide means or apparatus of this character that may be easily and quickly cleaned of foreign matter such as sand and the like should such foreign matter get into said apparatus.

Still another object of the invention is to provide apparatus of this character that has relatively few parts and is extremely simple in construction.

Another object of the invention is to provide apparatus of this character that is relatively inexpensive to manufacture.

Still another object of the invention is to provide apparatus of this character that may be easily and quickly assembled and may be easily and quickly disassembled for servicing and/or replacement of parts should that become necessary.

A further object of the invention is to provide apparatus of this character that is simple and effective in operation and that is durable and reliable.

This invention is particularly effective for conditioning the soil for small plants, shrubs, trees, lawns and all types of grasses.

The characteristics and advantages of the invention are further sufficiently referred to in connection with the following detailed description of the accompanying drawings, which represent one embodiment. After considering this example, skilled persons will understand that variations may be made without departing from the principles disclosed and I contemplate the use of any structures, arrangements, or modes of operation that are properly within the scope of the appended claims.

Referring to the drawings, which are for illustrative purposes only:

FIG. 1 is a perspective view of the present invention in use;

FIG. 2 is an enlarged longitudinal section of the device with the anti-siphon valve in the closed position;

FIG. 3 is a similar view of the upper portion of the device with the valve in the open or operating position;

FIG. 4 is a plan view of the fixed valve member or disc of the anti-siphon valve;

FIG. 5 is a similar view of the flexible valve member, positioned adjacent the fixed valve member; and FIG. 6 is a similar view of the other flexible valve member.

Referring more particularly to the drawings, there is shown apparatus embodying the invention and including what will be termed the spike, indicated generally at 10, and the anti-siphon valve, indicated generally at 12.

Spike 10 comprises a tubular member of pipe 14 of any suitable material such as, for example, aluminum, and said pipe has a longitudinal passage 16 therethrough. A lower end portion of said pipe is internally threaded, as at 18, and a tip, indicated generally at 20, has an externally threaded stem 22 screwed into said threaded end portion 18.

Tip 20 has a body 24 that is tapered downwardly as shown in FIGS. 1 and 2, to form a point 26 to facilitate penetration of the ground when the device is pushed thereinto. There is a longitudinally extending passage 28 which is open at its inner end to provide communication with the passage 16 of the pipe 14, the outer end of said passage 28 being closed. A plurality of cross bores 30 extend radially from the lower end of passage 28 through which fluid is discharged into the soil or ground.

Within the upper end portion of the pipe 14 there is a tubular insert, indicated generally at 32, said insert being secured in the pipe by an suitable means such as a press fit, for example.

The interior of the insert is so formed as to provide a venturi which includes a restricted passage or throat 34, below which there is an enlarged diameter passage 36 which extends downwardly and which flares downwardly and outwardly at 38. From the upper ends of throat 34 there is an enlarged diameter passage portion 40 which extends upwardly. At the upper end of the passage portion 40 said passage flares upwardly and outwardly, as at 42, to provide a valve seat.

The insert 32 has a radial passage 46 which extends from the throat 34 of the venturi and which is counterbored at 48 to provide an enlarged diameter outer end portion which is in axial alignment with an opening 50 in the pipe 14 for reception of a tube 52 of any suitable material, such as aluminum, for example. Tube 52 extends into the enlarged diameter portion 48 of the bore 46 and has a longitudinally extending passage 54 therethrough which communicates at its inner end with the bore 46. Thus the tube 52 not only serves to provide a fluid connection with the throat of the venturi but also serves to retain the insert 32 in operative position. Tube 52 is retained in the opening 50 and bore portion 48 by any suitable means. One such means is to press fit the tube in said opening 50 and bore portion 48.

The anti-siphon valve 12 is positioned at the upper end of the pipe 14 and comprises a hollow, cup-shaped body, indicated generally at 56, which includes a base 58 from the periphery of which extends an annular wall 60. Wall 60 has an outer end portion 62 that is internally threaded, an inner end portion of said wall being unthreaded at 64.

From the base 58 there depends, as shown in FIGS. 1, 2 and 3, a tubular extension 66 which is generally frusto-conical in shape with the smaller end at the bottom and terminating in an internally threaded collar 68. The interior of the extension comprises a chamber 70 the upper end of which communicates with an opening 72 in the base 58.

At its upper end pipe 14 has an externally threaded portion 74 for threadable reception of the collar 68. When the valve 12 is thus attached to the upper end of the pipe 14 the upper end of the insert 32 is disposed somewhat below the upper end 78 of the opening 72 in the base 58. Adjacent the upper end of the extension 66 said extension is provided with a plurality of annularly spaced vent openings 80 which provide an air break for the chamber 70.

Within the hollow interior of the cup-shaped body 56 of the anti-siphon valve 12 is a rigid, concavo-convex disc 82 that is of sufficient diameter to be frictionally held in the unthreaded portion of the interior of the valve body 56. This disc may be considered a fixed valve member and is of any suitable material, such as brass or aluminum, for example. The concave side of the disc faces the base 58 and there are a plurality of annularly spaced openings or perforations 84 in said disc intermediate the center and periphery thereof.

Between the disc 82 and the base 58 of the body 56 are a pair of valve members 86 and 88 respectively. The valve member 86 comprises a disc of flexible material having a central hole or opening 90 therethrough. This valve member may be of any suitable material, such as rubber, either natural or synthetic, or a plastic. Neoprene has been found to meet the requirements very well.

Member 86 is disposed directly below the disc 82 and the disc 88 is disposed beneath the disc 86. Disc 88 has crossed slits 92 at the center thereof to provide what may be termed an opening which is normally closed.

Both the valve members 86 and 88 are of somewhat greater diameter than the smooth walled inner portion of the body defined by the unthreaded wall 62 and these members are peripherally secured in the body 56 by the peripheral edge portion of the concavo-convex disc 82. Because of their greater diameter than the smooth walled portion of the body said members 86 and 88 will, under certain conditions, bulge upwardly as shown in FIG. 2. When in this position the central hole 90 of the disc 86 is closed by engagement of the central portion of said disc 86 against the adjacent side of the disc 82 and the holes 84 of disc 82 are closed or sealed by the part of the disc 86 beneath said holes 84. Thus the holes 84 and 90 are sealed when the disc 86 bulges upwardly.

Valve member 88 provides a safety factor by insuring complete and effective sealing of the hole or opening 90 in the valve member 86. When the parts are in the position shown in FIG. 2 there is a positive sealing of all the openings in both the disc 82 and the opening 90 in the valve member 86.

In FIG. 1 the device is shown attached to a hose 100 connected to the usual water system. The free end of the hose has the usual externally threaded connecting member 102 which is screwed into the body 56.

The valve members 86 and 88 will always tend to bow upwardly and seat as shown in FIG. 2 and will automatically and quickly seat in this position should there be suction or vacuum above them. This condition could and does occur under certain conditions. For example, should there be a fire and the fire engines are drawing a lot of water from the mains to which the device may be connected there would be sufficient vacuum to cause the valve to securely close. Thus the valve 12 functions as an anti-siphon valve and effectively prevents back flow which would carry fertilizer or other material being introduced into the soil by the device when the above condition occurs.

When the device is in use it is capable of irrigating the soil, aerating the soil, and introducing fertilizers, fungicides and the like into the soil.

For simple irrigation purposes the tube 52 is closed. A simple cap 104 of plastic or other suitable materials is placed on the free end of said tube and when the water is flowing through the device the water under normal hydrant pressure passes through the openings 84 of the fixed valves member 82 and forces the flexible valve members 86 and 88 downwardly to the valve open position shown in FIG. 3. When the parts are in this position the central portion of the valve member 88 seats on the valve seat 42 and the water flows through the opening 90 in the valve member 86 forcing the lips 106 between the cross slits 92 downwardly so that the water will flow into insert 32, through the venturi throat, out the lower end of the venturi, down the pipe 14 and out the openings 30 in the tip 20, and thence into the soil.

Should it be desired to aerate the soil, the cap 104 is removed from the tube 52 and due to the lowered pressure in the venturi throat 34 air will be drawn through the passage 54 of the tube 52, into the venturi throat 34 and into the water flowing through said venturi throat. This air mixes with the water flowing through the lower portion of the venturi passage and the pipe 14 and is carried into the soil as the water permeates said soil.

In order to introduce fertilizers, fungicides or the like into the soil, one end of a flexible tube or hose 108 is attached to the tube 52, as best shown in FIGS. 1 and 2, the other end of said tube or hose 108 being inserted into a container 110 of liquid fertilizer, fungicide or the like and this liquid is drawn through the tube 108, tube 52, and into the venturi throat 34. This liquid is mixed with and carried by the water through the pipe 14 and into the soil.

Openings 80 in the extension 66 serve as an air break for the chamber 70 and allow the valve discs or members 86 and 88 to freely flex and move between the closed position shown in FIG. 2 and the open position shown in FIG. 3.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned except as defined in the accompanying claims, wherein various portions have been separated for clarity of reading and not for emphasis.

I claim:
1. A soil conditioning device, comprising:
 (A) a spike pointed at its lower end and having a fluid passage extending longitudinally therethrough and radially extending discharge openings adjacent the lower end;
 (B) an insert in the upper end of said spike, said insert extending upwardly of the upper end of said spike and having a venturi-shaped passage extending longitudinally therethrough with a venturi throat, said insert having a laterally extending opening registering with an opening in said spike;
 (C) a tube extending through the opening in the spike and into the opening in said insert;
 (D) an anti-siphon valve having a recessed internally threaded body with a smooth walled portion at the bottom of said recess, said body including a wall normal to the axis of said body and having a relatively large opening therethrough;
 (E) a depending hollow extension having a collar adjacent the lower end thereof removably attached to the upper end of said spike, said extension defining a chamber communicating with the opening in the wall of said body and having vent openings in the wall thereof to provide an air break for said chamber, the upper end of said insert being spaced downwardly somewhat from the upper end of the opening in the body wall, the upper end of said insert having a flared valve seat therein communicating with the upper end of the venturi passage in said insert;
 (F) a flexible valve member in the lower end of the recess of said body, said valve member having crossed slits at the center thereof, said valve member being of greater diameter than the diameter of the lower end of said recess in the body;
 (G) a second flexible movable valve member of substantially the same diameter as the first mentioned flexible movable valve member, said second valve member having a central opening therein;

(H) and a concavo-convex disc with the concave side facing downwardly, said disc being of greater diameter than the internal diameter of the inner end of said recess and pressed thereinto thereby peripherally securing said flexible valve members, said disc having a plurality of annularly spaced openings therethrough spaced outwardly of the central opening in the second mentioned flexible movable valve member, said movable valve member being adapted to move between an upper closed position whereat the second movable valve member has its upper surface seated against the inner surface of the disc and the first mentioned movable valve member has its upper surface seated against the inner side of the second mentioned movable valve member with the cross-slitted portion thereof in alignment with the opening in the second mentioned valve member, and a position whereat the central portions of said movable valve members extend downwardly and the lower side of the first mentioned movable valve member seats on the valve seat on said insert and the second movable valve member has its under side in engagement with the top side of the first movable valve member, pressure fluid being adapted to flow through the openings in the disc and force said movable valve members to the second mentioned position and flowing through the central opening in the second movable valve member and forcing the slitted part of the first valve member open so that said fluid will flow into the upper end of the venturi passage through the insert and downwardly through said venturi passage, thence downwardly through the passage in the spike and out the outlet openings thereof.

2. A soil conditioning device, comprising:
(A) a spike having a fluid passage extending longitudinally therethrough and discharge openings adjacent the lower end;
(B) an insert in the upper end of said spike, said insert extending upwardly of the upper end of said pipe and having a venturi-shaped passage extending longitudinally therethrough with an inlet at the upper end and a venturi throat intermediate the ends of said passage;
(C) an anti-siphon valve having a recessed internally threaded body for attachment to a conduit for fluid, said body including a wall normal to the axis of said body and having a relatively large opening therethrough;
(D) a depending hollow extension having a collar adjacent the lower end thereof removably attached to the upper end of said spike, said extension defining a chamber communicating with the opening in the wall of said body and having an air break opening for said chamber, the upper end of said insert being adjacent the opening in the body wall, the upper end of said insert having a valve seat communicating with the inlet end of the venturi passage in said insert;
(E) a flexible valve member in the lower end of the recess of said body, said valve member having a normally closed opening at the center thereof;
(F) a second flexible movable valve member of substantially the same diameter as the first mentioned flexible movable valve member, said second valve member having a central opening therein;
(G) and a disc in said recess, the under side of said disc being concave, said disc being pressed into said recess and securing said flexible valve members in said recess, said disc having a plurality of annularly spaced openings therethrough spaced outwardly of the central opening in the second mentioned flexible movable valve member, said movable valve members being adapted to move between an upper closed position whereat the second movable valve member has its upper surface seated against the inner surface of the disc and the first mentioned movable valve member has its upper surface seated against the inner side of the second mentioned movable valve member, and a position whereat the central portions of said movable valve members extend downwardly and the lower side of the first mentioned movable valve member seats on the valve seat of said insert and the second movable valve member has its under side in engagement with the top side of the first movable valve member, pressure fluid being adapted to flow through the openings in the disc and force said movable valve members to the second mentioned position and flowing through the openings in the movable valve members and into the upper end of the venturi passage through the insert and downwardly through said venturi passage, thence downwardly through the passage in the spike and out the discharge openings thereof.

3. An anti-siphon valve for soil conditioning device:
(A) an element having a passage extending longitudinally therethrough, at least a part of said passage defining a venturi passage;
(B) a body having a recess therein, said body including a bottom wall having a relatively large opening therethrough;
(C) a hollow extension for said body removably attachable to a support, said extension defining a chamber communicating with the opening in the wall of said body and having vent means to atmosphere providing an air break for said chamber, the inlet end of said element being adjacent the opening in the body wall, the inlet end of said element having a valve seat communicating with the upper end of the venturi passage of said element;
(D) a flexible valve member in the bottom of the recess of said body, said valve member having crossed slits at the center thereof, said valve member being of greater diameter than the diameter of the lower end of said recess in the body;
(E) a second flexible movable valve member of substantially the same diameter as the first mentioned flexible movable valve member, said second valve member having a central opening therein;
(F) and a concavo-convex disc with the concave side facing downwardly, said disc being of greater diameter than the internal diameter of the inner end of said recess and pressed thereinto thereby peripherally securing said flexible valve members, said disc having a plurality of annularly spaced openings therethrough spaced outwardly of the central opening in the second mentioned flexible movable valve member, said movable valve members being adapted to move between a closed position whereat the second movable valve member has a surface seated against the inner surface of the disc and the first mentioned movable valve member has a surface seated against the inner side of the second mentioned movable valve member with the cross-slitted portion thereof in alignment with the opening in the second mentioned valve member, and a position whereat the central portions of said movable valve members extend through the opening in the bottom wall of said body and the side of the first mentioned movable valve member opposite said disc seats on the valve seat on said element and the second movable valve member has a side in engagement with the top side of the first movable valve member, pressure fluid being adapted to flow through the openings in the disc and force said movable valve members to the second mentioned position and flowing through the central opening in the second movable valve member and forcing the slitted part of the first valve member open so that said fluid will flow into the adjacent inlet end of the venturi passage through the element and through said venturi passage.

4. In a soil conditioning device:
(A) an elongated element for insertion into the ground, said element having a longitudinally extending passage therein and outlet openings therefrom adjacent the lower end thereof;
(B) means defining a venturi at the upper end of said element, said venturi having a venturi throat and an inlet at the upper end defining a valve seat;
(C) a valve body having a recess therein having a wall at the lower end, said wall having a relatively large opening therein in alignment with the inlet end of the venturi;
(D) means extending from said wall, said means being removably attached to the upper end of said element and defining a chamber vented to atmosphere;
(E) a pair of flexible movable valve members in said recess, said valve members being adjacent each other one above the other, and a fixed valve disc having its under side concave, said disc having a plurality of annularly spaced openings therein between the center and periphery thereof, the central portion of said disc being solid, the upper movable valve member having an opening therein and the lower movable valve member being slitted to provide a normally closed opening defined by portions thereof movable between a closed position and an open position when subjected to pressure, the slitted portion of said valve member being in alignment with the central opening of the top valve member and operable by fluid pressure in the opening in the upper valve member, said movable valve members being movable between a position whereat they bulge upwardly so that the upper valve member engages the under side of said disc and closes the openings therein with the central opening of said valve member closed by the solid portion of said disc and the slitted portion of the lower valve member being in the closed position, and a position whereat the central portion of said valve members are bowed downwardly with the central portion of the lower valve member engaging the valve seat of the upper end of said venturi, the central opening of said upper disc being in register with the upper end of said venturi passage and the slitted portion of the lower valve member being in register with the opening in said upper valve member and also with the upper end of the venturi passage.

5. In a soil conditioning device:
(A) an elongated element for insertion into the ground, said element having a longitudinally extending passage therein and outlet openings therefrom adjacent the lower end thereof;
(B) means defining a venturi at the upper end of said element, said venturi having a venturi throat and an inlet at the upper end provided with a valve seat, the opposite outlet end discharging into the passage in said element;
(C) a valve body having a recess therein closed by a wall at the lower end, said wall having a relatively large opening therein in alignment with the inlet end of the venturi;
(D) means connecting said valve body to the upper end of said element;
(E) a pair of flexible movable valve members in said recess, said valve members being adjacent to and aligned with each other, and a fixed valve member having its under side concave, said fixed valve member being aligned with said movable valve members and having a plurality of annularly spaced openings therein spaced from the center thereof, the central portion of said fixed valve member being solid, the movable valve member adjacent said disc having a central opening therein, the lower movable valve member being slitted to provide a normally closed opening defined by portions thereof movable between a closed position and an open position when subjected to pressure, the slitted portion of said valve member being in alignment with the central opening of the top valve member, said movable valve members being movable between a position whereat they bulge toward said fixed valve member so that the valve member adjacent said fixed valve member engages the under side thereof and closes the openings therein with the central opening of said valve member closed by the solid portion of said fixed valve member and the slitted portion of the other valve member being in the closed position, and a position whereat the central portions of said movable valve members are spaced from said fixed valve member with the central portion of said other valve member engaging the valve seat of the adjacent inlet end of said venturi, the central opening of the movable valve member adjacent said fixed valve member being in register with the upper end of said venturi passage and the slitted portion of the lower valve member being in register with the opening in said upper valve member and also with the upper end of the venturi passage.

6. The invention defined by claim 5, including a tube having one end connected with the throat of said venturi.

7. The invention defined by claim 6, wherein there is a cap closing the tube.

8. The invention defined by claim 6, wherein there is a container for fluid to be drawn into the venturi throat; and a flexible tube having one end connected to the tube connected with the venturi throat and having its opposite end disposed in said container.

9. The invention defined by claim 5, including means for providing a supplemental fluid connection with the throat of the venturi.

10. The invention defined by claim 9, wherein there is means for closing said supplemental connection.

11. The invention defined by claim 9, wherein there is a container for fluid to be drawn into the venturi throat; and a conduit having one end connected to said supplemental connection and having its opposite end operably connected to said container.

12. In a check valve for soil conditioning device:
(A) a valve body having a recess therein having a wall with an outlet opening therein;
(B) a pair of flexible aligned movable valve members in said recess, said valve members disc shaped being adjacent each other, and a fixed valve member having its inner side concave, said fixed valve member having a plurality of annularly spaced openings therein between the center and periphery thereof, the central portion of said fixed valve member being solid, the movable valve member adjacent said fixed valve member having a central opening therein, the other movable valve member being slitted to provide a normally closed opening defined by portions thereof movable between a closed position and an open position when subjected to pressure, the slitted portion of said valve member being in alignment with the central opening of the movable valve member adjacent the fixed valve member, said movable valve members being movable between a position whereat the movable valve member adjacent the fixed valve member lies against the inner side of the latter and the other movable valve member lies against the side of the movable valve member adjacent the fixed valve member, the latter valve member closing the openings in the fixed valve member with the central opening of said movable valve member closed by the solid portion of said fixed valve member, the slitted portion of the other valve member being closed, and a position whereas the central portion of said movable valve members are spaced from the central portion of said fixed valve member.

13. In a check valve:
(A) a valve body having an inlet and an outlet;

(B) valve members between said inlet and said outlet, there being a pair of flexible movable substantially disc shaped valve members, said valve members lying against each other and movable together;

(C) and a fixed valve member having at least one opening spaced from the center thereof, the central portion of said fixed valve member being imperforate, one of the movable valve members being adjacent the fixed valve member when in the closed position, said one movable valve member having an opening therein and the other movable valve member having a central normally closed opening operable when subjected to fluid pressure, the openings of said movable valve members being in alignment with each other, said movable valve member being movable between a position whereat the movable valve member adjacent the fixed valve member engages the adjacent side of said fixed valve member and closes the openings therein, the central opening of said movable valve member being closed by the imperforable portion of said fixed valve member, the central portion of said other movable valve member being in the closed position sealing the central opening of said movable valve member adjacent said fixed valve member, and a position whereat the central portion of said valve members are spaced from the central portion of the fixed valve member.

References Cited by the Examiner

UNITED STATES PATENTS

| | | | |
|---|---|---|---|
| 2,214,083 | 9/1940 | Lester | 111—7.1 X |
| 3,034,731 | 5/1962 | Chapin | 239—318 |
| 3,122,325 | 2/1964 | Mahit et al. | 239—318 |
| 3,142,273 | 7/1964 | Dilts | 111—7.1 |
| 3,186,643 | 6/1965 | George et al. | 137—218 X |

ABRAHAM G. STONE, *Primary Examiner.*

W. A. SMITH III, *Assistant Examiner.*